United States Patent
Dvorak et al.

[19]

[11] Patent Number: 5,931,445
[45] Date of Patent: Aug. 3, 1999

[54] MULTI-VANE FLOW RATE STABILIZER FOR THROTTLING VALVES

[75] Inventors: Allen D. Dvorak; Paul J. Schafbuch, both of Marshalltown; David J. Westwater, Albion; Gerald L. Mimick, Marshalltown, all of Iowa

[73] Assignee: Fisher Controls International, Inc., Clayton, Mo.

[21] Appl. No.: 08/856,526

[22] Filed: May 14, 1997

Related U.S. Application Data

[63] Continuation-in-part of application No. 08/558,174, Nov. 15, 1995, Pat. No. 5,765,814.

[51] Int. Cl.⁶ .................................................. F16K 47/08
[52] U.S. Cl. .............................................. 251/118; 251/359
[58] Field of Search ..................................... 251/118, 123, 251/124, 127, 359

[56] References Cited

U.S. PATENT DOCUMENTS

| | | | |
|---|---|---|---|
| 597,842 | 1/1898 | Edmands | 251/118 |
| 1,461,039 | 7/1923 | Leslie | 251/127 |
| 2,524,009 | 9/1950 | Dopp et al. . | |
| 3,776,278 | 12/1973 | Allen . | |
| 3,990,475 | 11/1976 | Myers . | |
| 4,326,554 | 4/1982 | Gongwer . | |
| 4,506,860 | 3/1985 | von Schwerdtner et al. . | |
| 4,623,002 | 11/1986 | Schoonover et al. | 251/118 X |
| 4,960,260 | 10/1990 | McEnearney . | |
| 4,967,998 | 11/1990 | Donahue . | |
| 4,986,512 | 1/1991 | Tiefenthaler . | |
| 5,209,259 | 5/1993 | Dear et al. . | |
| 5,765,814 | 6/1998 | Dvorak et al. | 251/118 X |

FOREIGN PATENT DOCUMENTS

| | | |
|---|---|---|
| 684 060 | 12/1966 | Belgium . |
| 0 216 992 | 4/1987 | European Pat. Off. . |
| 2 238 884 | 2/1975 | France . |
| 21 10 149 | 9/1972 | Germany . |
| 26 48 540 | 5/1978 | Germany . |
| 31 38 459 | 6/1982 | Germany . |
| 37 17 128 | 12/1988 | Germany . |
| 57-107469 | 7/1982 | Japan . |
| 59-140967 | 8/1984 | Japan . |
| 59-140973 | 8/1984 | Japan . |
| 2 019 532 | 10/1979 | United Kingdom . |
| 2 133 902 | 9/1984 | United Kingdom . |
| WO 97/18411 | 5/1997 | WIPO . |

OTHER PUBLICATIONS

Fisher Controls Brochure, "Design EZ Sliding–Stem Control Valves," *Fisher Controls,* Bulletin 51.1:EZ, pp. 1–18 (Apr. 1994).
Fisher Controls Brochure, "For Economical and Accurate Control, Type 399A Makes Its Easy," Form 8366, 16 pp., 1995.
Fisher Controls, Type 399 Easy Joe Valve spec. sheet, 1 p.
Leslie Controls Brochure, "Aeroflow," 4 pp.
Two Fisher Controls Drawings Illustrating the Fisher Controls 4–1500 HP Valve.
PCT/US 98/03389 International Search Report dated Jun. 30, 1998.

*Primary Examiner*—Kevin Lee
*Attorney, Agent, or Firm*—Marshall, O'Toole, Gerstein, Murray & Borun

[57] ABSTRACT

A valve includes a fluid inlet passageway coupled to a fluid outlet passageway through an orifice and a valve plug that is moveable with respect to the orifice to vary the rate of fluid flow through the orifice. A seat ring is disposed at the orifice and includes a structural member having three vanes connected in a Y-shaped configuration extending into the fluid inlet passageway adjacent the orifice. The Y-shaped vane configuration prevents disturbances, such as intermittent vortices, from forming within the fluid in the fluid inlet passageway and, thereby, provides a stable rate of fluid flow through the valve.

22 Claims, 8 Drawing Sheets

MULTI-VANE FLOW RATE STABILIZER FOR THROTTLING VALVES

RELATED APPLICATION

This is a continuation-in-part of U.S. patent application Ser. No. 08/558,174 filed Nov. 15, 1995, Pat. No. 5,765,814.

TECHNICAL FIELD

This invention relates generally to valves and more particularly to throttling valves having flow rate stabilizers therein.

BACKGROUND OF THE INVENTION

Throttling valves are used in a wide number of process control system applications to control some parameter of a process fluid. While the process control system uses a throttling valve to control the pressure, level, pH or other desired parameter of a fluid, the throttling valve ultimately controls the rate of fluid flow.

Typically, a throttling valve includes a fluid inlet passageway coupled through an orifice to a fluid outlet passageway and a closure member disposed in the orifice which controls the amount of fluid flow therethrough. The closure member may include a valve plug having a surface which seats against a seat ring disposed at the orifice. During operation, the control system moves the valve plug towards and away from a surface of the seat ring to provide a desired fluid flow through the orifice and, therefore, the throttling valve.

The flow rate of a throttling valve is generally considered, by definition, to be a steady-state value for a given valve plug position and given pressure conditions. As a result, system designers have traditionally treated the flow rate of a throttling valve as a constant when designing a control system. In reality, however, the flow rate of a throttling valve does not remain perfectly constant but fluctuates during use. Changes in the flow rate of a valve may manifest themselves as momentary jumps in the valve flow rate or as persistent changes in the valve flow rate resulting in, for example, bi-stable flow rates. Although it has been surmised that the change in valve flow rate is related to turbulence, the precise cause of changes in the flow rate of valves has been, heretofore, unknown.

It is, however, generally known that turbulence is produced in a valve under most conditions. Turbulence is an irregular condition of fluid flow in which the pressure, the velocity, etc. of a fluid vary chaotically. Turbulence exists over a range of physical dimensions and time scales, i.e., from physically large fluid motions to physically small fluid motions and from rapid random changes to slow random changes.

Furthermore, during operation of a valve, the fluid in the valve must speed up to pass through the flow restriction created by the valve plug and the orifice. It has been conjectured that turbulence and/or the higher speed flow of a fluid in a valve may lead to flow patterns within the valve that are not stable. These unstable flow patterns may cause flow rate disturbances.

Flow rate disturbances, which may occur to a greater or lesser amount at different fluid pressures and flow rates, appear within a throttling valve over a wide range of frequencies and operate to effect the fluid flow through the valve. Some of the flow disturbances within a throttling valve occur at frequencies which are much greater than the characteristic frequency of the process being controlled or much greater than the frequency range over which typical control process equipment can respond. These high frequency flow disturbances manifest themselves as noise and are effectively filtered out by the mechanical flow capacitance inherent in the process. As a result, these high frequency disturbances do not significantly effect the operation of the control system.

Furthermore, some disturbances within a throttling valve occur at frequencies that are much lower than the characteristic frequencies of the process and the process control equipment. The process control system can compensate for these low frequency disturbances during closed-loop operation because the control system is able to recognize the slowly changing values of fluid flow caused by these low frequency disturbances and adjust the throttling valve accordingly.

However, disturbances that appear at frequencies on the order of the characteristic frequencies associated with the process and the process control equipment, that is, intermediate frequency disturbances, cause significant problems in the process control system because the process controller is changing process control parameters to compensate for these disturbances at about the same rate that the disturbances are appearing and disappearing. The process controller, therefore, has a hard time keeping up with these intermediate frequency disturbances which, in turn, leads to poor controller performance.

Up until the present, no one really understood what was causing intermediate frequency disturbances and, therefore, how to best negate these disturbances in a process. Furthermore, there has been no widely applicable solution for reducing the intermediate frequency disturbance in a valve, such as a throttling valve.

SUMMARY OF THE INVENTION

It has been discovered that disturbances in the flow rate of a valve result from the formation of fluid flow disturbances such as quasi-steady-state vortices in the upstream or fluid inlet passageway of a valve and that the formation and break-up of these vortices corresponds to the apparent change in valve flow rate. It has also been determined that, to provide a valve with as stable a flow rate as possible, it is important to prevent disturbances, such as the intermittent formation and break-up of vortices, within the upstream or fluid inlet passageway of a valve.

The present invention relates to valve designs and, in particular, to seat ring designs, valve plug designs and fluid passageway designs for use in a valve, such as a throttling valve, which eliminate intermediate frequency fluid flow disturbances caused by turbulence or other physical phenomena by preventing the intermittent formation of vortices within the fluid present in the upstream or fluid inlet passageway of the valve.

According to one aspect of the invention, a valve includes a fluid inlet passageway coupled through a fluid outlet passageway to a fluid outlet. An orifice is disposed between the fluid inlet passageway and the fluid outlet and a valve plug is movably disposed with respect to the orifice to vary the flow rate of the fluid through the valve. A member is disposed in the fluid inlet passageway which reduces the intermittent disturbances of the fluid in the fluid inlet passageway.

The disturbance reduction member may comprise a vane disposed in the fluid inlet passageway, extending from, for example, a seat ring disposed in the orifice. This vane may be disposed in a parallel, perpendicular or diagonal manner with respect to the flow of fluid through the fluid inlet passageway. Alternatively, the disturbance reduction member may include multiple vanes that are configured in, for example, a cross shape, a Y-shape or any other shape. Furthermore, the disturbance reduction member may be coupled to the valve plug or to a wall of the fluid inlet passageway instead of the seat ring.

BRIEF DESCRIPTION OF THE DRAWINGS

The advantages of the present invention will be apparent upon reading the following description in conjunction with the drawings, in which.

DETAILED DESCRIPTION

Figure 1:
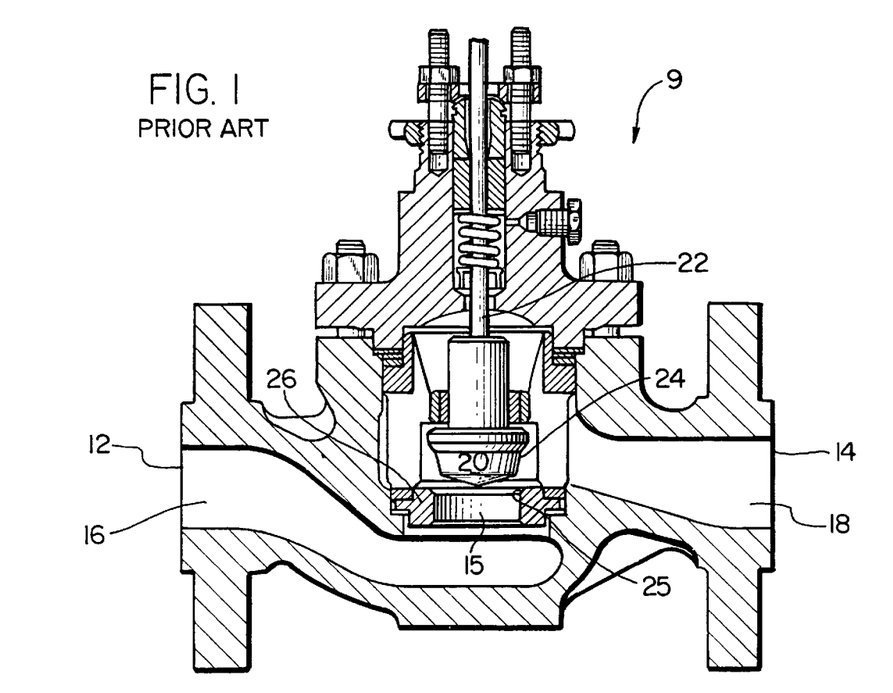
FIG. 1 is a cross-sectional view of a known throttling valve.

Referring now to FIG. 1, a prior art throttling valve 9 includes a fluid inlet 12, a fluid outlet 14 and a fluid inlet passageway 16 which couples the fluid inlet 12 through an orifice 15 to a fluid outlet passageway 18. A valve plug 20 is coupled through a valve stem 22 to an actuator (not shown), and has an outer surface 24 that comes into contact with a valve seat such as a surface 25 of a seat ring 26 disposed in the orifice 15. The seat ring 26 comprises an annular ring member having an aperture therethrough that accepts the valve plug 20. However, no part of the seat ring 26 is disposed in the fluid inlet chamber 16.

During operation of the throttling valve 9, the actuator (not shown) moves the valve stem 22 and the valve plug 20 towards and away from the seat ring 26 to close and open, respectively, the throttling valve 9. The position of the valve plug surface 24 with respect to the surface 25 of the seat ring 26 determines the rate at which fluid flows between the valve plug 20 and the seat ring 26 and, therefore, the rate at which fluid flows through the throttling valve 9.

Figure 2:
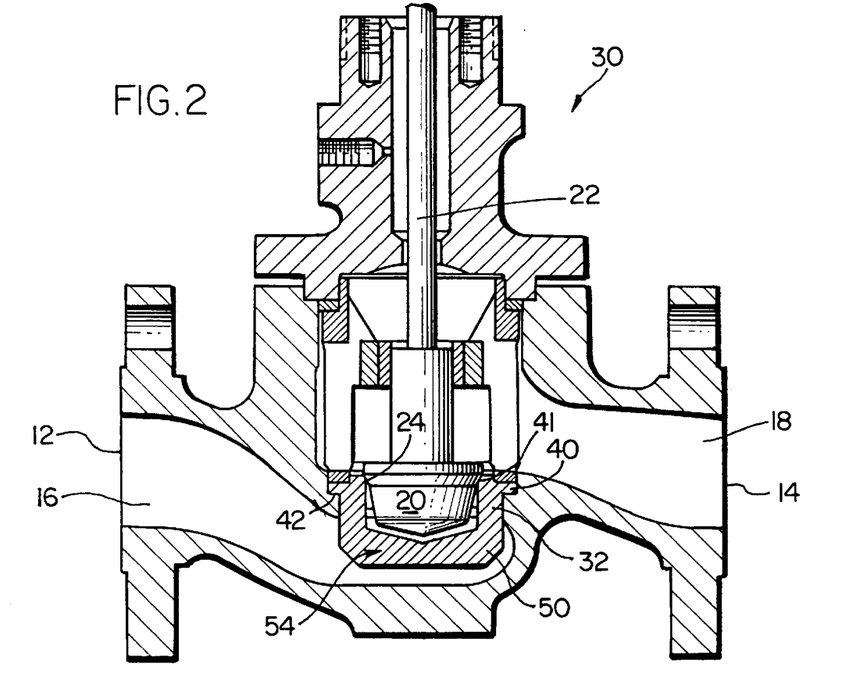
FIG. 2 is a cross-sectional view of a first embodiment of a throttling valve having a seat ring according to the present invention.
Figure 3:
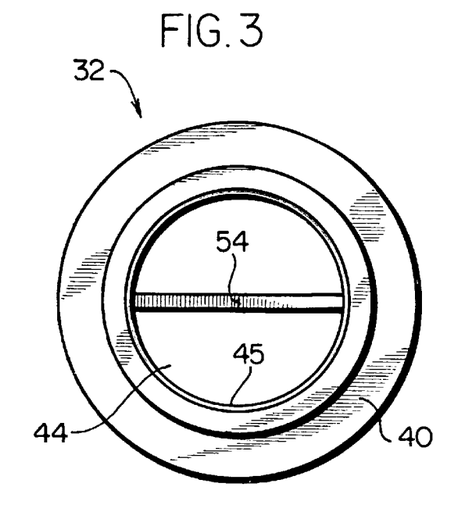
FIG. 3 is a top elevational view of the seat ring of FIG. 2.
Figure 4:
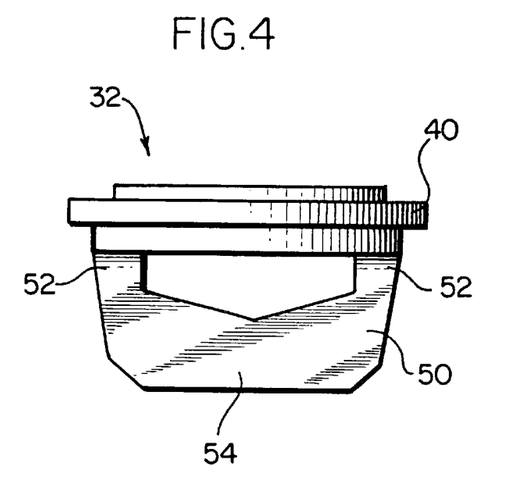
FIG. 4 is a side elevational view of the seat ring of FIG. 2.
Figure 5:
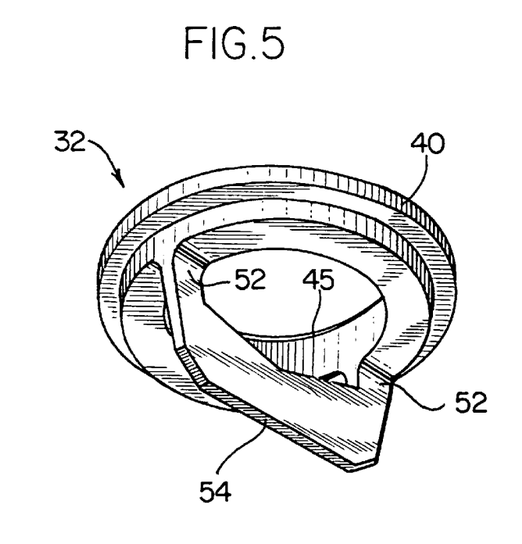
FIG. 5 is a perspective view of the seat ring of FIGS. 2–4.
Figure 6:
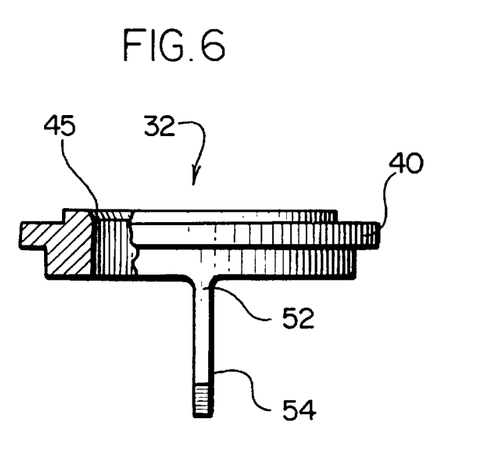
FIG. 6 is a partially cut away, side elevational view of the seat ring of FIGS. 2–5.

Referring now to FIG. 2, a throttling valve 30 constructed according to the present invention is illustrated. The throttling valve 30, which is specifically adapted for use in liquid applications but may also be used in gas applications, is similar to the throttling valve 9 of FIG. 1 and has like components numbered identically thereto. However, a seat ring 32 of the throttling valve 30 includes a member disposed in the fluid inlet passageway 16 that prevents disturbances, such as quasi-steady-state vortices, from forming in the fluid inlet passageway 16.

With reference to FIGS. 2–6, the seat ring 32 includes a ring member 40 disposed against a ledge 42 formed in the valve 30. The ring member 40 includes an aperture or hole 44 adapted to receive the valve plug 20 and a surface 45 that comes into contact with the valve plug surface 24 when the valve plug 20 is driven to the closed position. The seat ring 32 also includes a vane 50 having two leg portions 52 connected to the ring member 40 and a connecting member 54 disposed between the two leg members 52 directly adjacent or beneath the aperture 44 of the ring member 40.

As illustrated in FIG. 2, the connecting member 54 is disposed within the fluid inlet passageway 16 directly adjacent a lower surface of the valve plug 20 when the seat ring 32 is disposed in the throttling valve 30. The vane 50 of the seat ring 32, when disposed in the fluid inlet passageway 16, prevents or breaks up vortices that may occur within the fluid inlet passageway 16 while fluid is flowing between the fluid inlet passageway 16 and the fluid outlet passageway 18. In particular, as soon as a vortex starts to form within the fluid inlet passageway 16, that is, circulation of fluid within the fluid inlet passageway 16 with fluid velocity in a direction other than the direction normal to the orifice 15, the vane 50 blocks the circular or swirling flow components of that vortex and, thereby, dissipates the vortex. This function, in turn, prevents flow disturbances, such as intermittent vortices, from occurring within the throttling valve 30.

Figure 7:
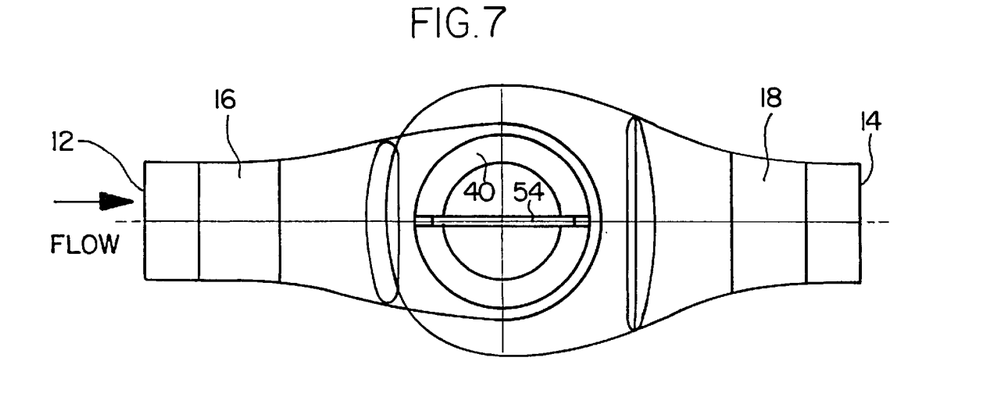
FIG. 7 is a bottom wire-frame diagram view of the throttling valve of FIG. 2.
Figure 8:
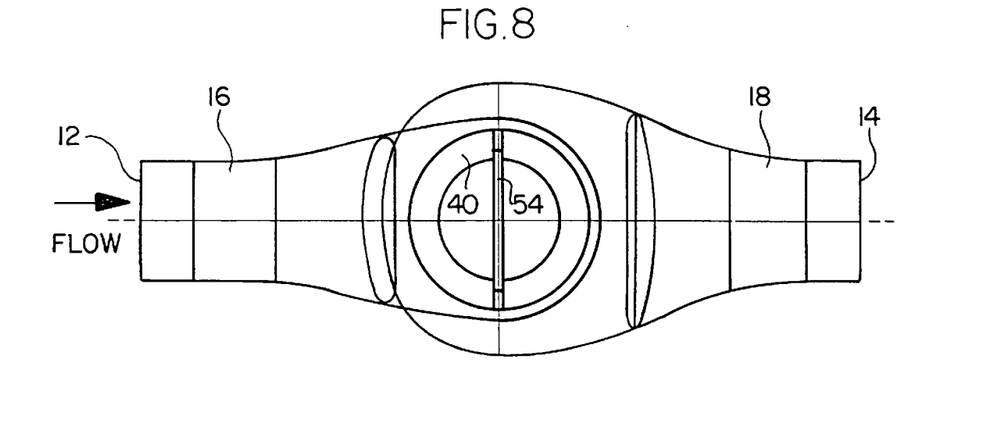
FIG. 8 is a bottom wire-frame diagram view of a throttling valve having the seat ring of FIGS. 3–6 disposed perpendicularly to the fluid flow direction.
Figure 9:
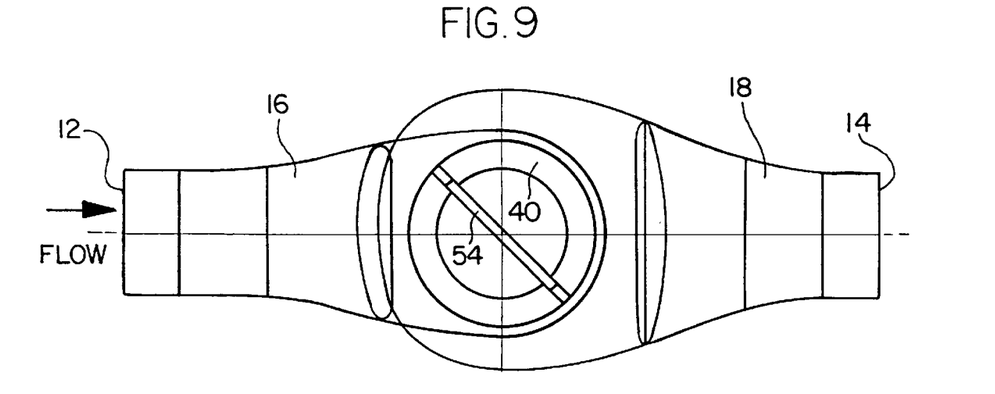
FIG. 9 is a bottom wire-frame diagram view of a throttling valve having the seat ring of FIGS. 3–6 disposed diagonally to the fluid flow direction.

The vane 50 of the seat ring 32 is illustrated in FIG. 2 and FIG. 7 as being disposed parallel to the direction of the flow of the fluid in the fluid inlet passageway 16. However, the vane 50 may also be disposed perpendicular to the direction of fluid flow through the fluid inlet passageway 16, as illustrated in FIG. 8, or may be disposed at any diagonal angle with respect to the direction of fluid flow through the fluid inlet passageway 16. FIG. 9, for example, illustrates the connecting member 54 of the vane 50 oriented at a 45° diagonal angle with respect to the fluid flow direction of the fluid inlet passageway 16. It is preferable, however, to orient the vane 50 parallel to the direction of fluid flow through the fluid inlet passageway 16 to present the least flow resistance to the fluid in the throttling valve 30.

Although the vane 50 has been illustrated as having a single straight member disposed across the center of the aperture 44 of the ring member 40 and as having a generally V-shaped upper surface, the vane 50 can be any other desired shape, for example, curved, can include multiple vanes extending from the ring member 40 disposed in a parallel or any non-parallel manner and can have one or more vanes that cross the aperture 44 of the ring member 40 at any desired location, that is, between any two circumferential points of the ring member 40.

Figure 10:
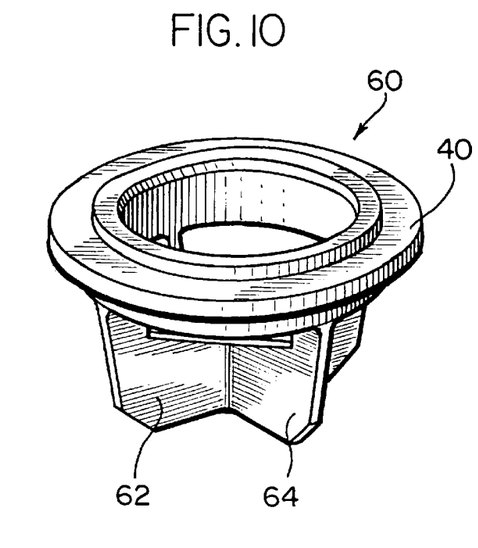
FIG. 10 is a perspective view of a second embodiment of a seat ring according to the present invention.
Figure 11:
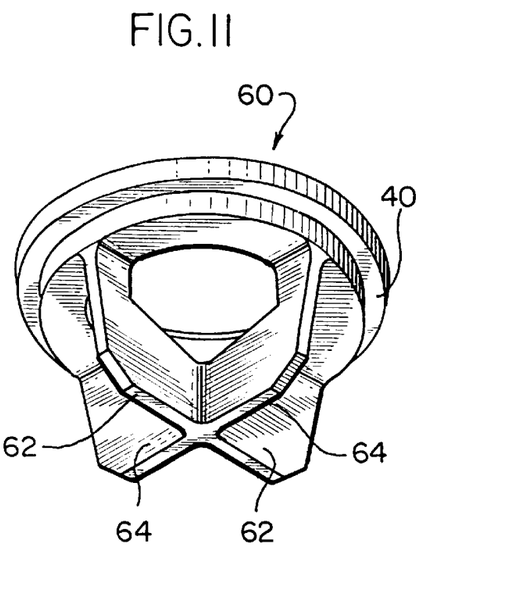
FIG. 11 is a further perspective view of the seat ring of FIG. 10.

Referring to FIGS. 10 and 11, a further embodiment of a seat ring 60 for use in the throttling valve 30 is illustrated. The seat ring 60 has two perpendicularly disposed vanes 62 and 64 connected to the ring member 40. While the vanes 62 and 64 are illustrated in FIGS. 10 and 11 as intersecting each other at 90° angles to form a cross-shaped member, these vanes could, instead, cross at any other desired angle or could be disposed parallel to one another.

Figure 20:
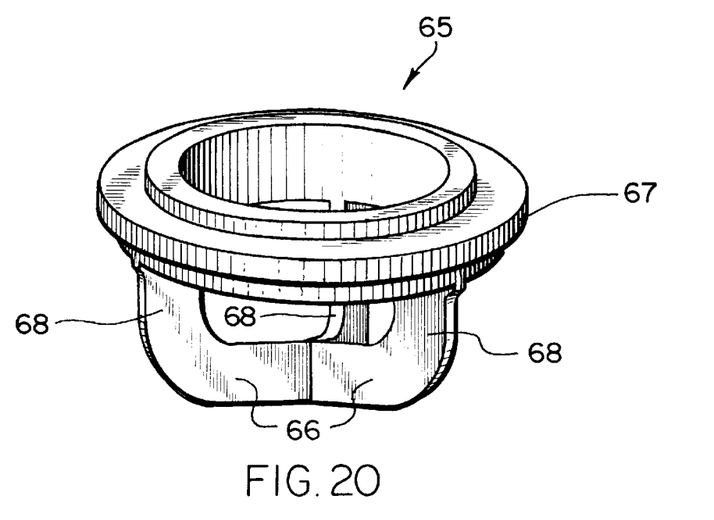
FIG. 20 is a perspective view of another embodiment of a seat ring having a Y-shaped vane configuration according to the present invention.
Figure 21:
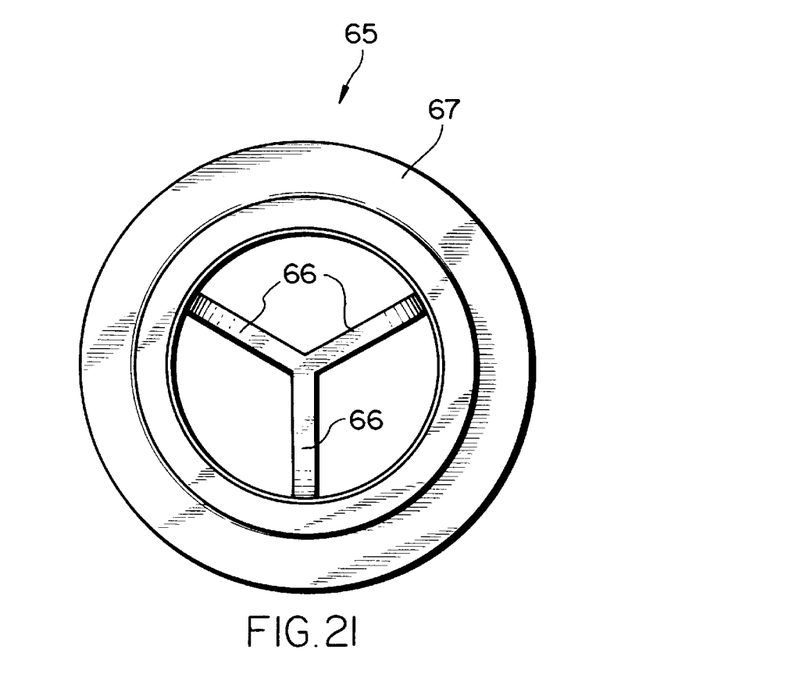
FIG. 21 is a top view of the seat ring of FIG. 20.

Referring to FIGS. 20 and 21, a seat ring 65 has a Y-shaped vane configuration including three vanes 66 extending radially away from a central point or center of, and towards the circumference of, a seat ring base 67. The seat ring base 67 has a circular orifice or aperture therein adapted to receive a valve plug 20 (FIG. 2) and, therefore, comprises a valve seat. As illustrated in FIGS. 20 and 21, each of the vanes 66 includes a leg 68 attached to the seat ring base 67 and the vanes 66 are angularly offset from one another by approximately 120 degrees. However, if desired, the vanes 66 could be offset from one another by other, for example, non-equal angles. Furthermore, four, five, or any other number of vanes 66 could extend out from the center (or any other point) of the seat ring base 67 and these vanes could be offset from one another by any equal or any number of non-equal angles. Still further, one or more vanes could extend across the circular orifice of the seat ring base 67 without passing through the center of that orifice. For example, the vanes 66 could extend as a chord to the circumference of the seat ring base 67 or could extend only partially across the orifice of the seat ring base 67. If desired, the Y-shaped vanes of FIGS. 20 and 21 could alternatively be disposed on the valve plug 20 of the valve 30 (FIG. 2).

The Y-shaped vane configuration of FIGS. 20 and 21 is considered to be particularly advantageous because it allows the seat ring 65 to be held in a three jaw lathe chuck (a standard manufacturing tool) such that the clamping loads are applied at the points where the vanes 66 are connected to the seat ring base 67 which, in turn, reduces potential distortion of the concentric surfaces of the seat ring 65 during manufacturing thereof. Furthermore, the Y-shaped vane configuration of FIGS. 20 and 21 has an increased rigidity relative to forces applied to the vanes by fluid flowing through the seat ring 65 and can, therefore, be made thinner than the vane of the single vane configuration of, for example, FIGS. 3–6. Thus, while a single vane of a particular thickness may be susceptible to fatigue failure caused by flow induced vibration, the Y-shaped vane configuration of FIGS. 20 and 21 may not be susceptible to such failure at the same thickness. Still further, it is believed that the three vane construction of FIGS. 20 and 21 is easier to cast due to the number of metal flow paths created in the casting process.

Also, for viscous flow applications where a stable flow is not required, it may be necessary or desirable to remove the vanes 66 from the seat ring base 67 without warping the seat ring base 67. It is believed that less stress will be applied to the seat ring base 67 during casting and machining of the Y-shaped vanes 66 than of a single vane and that, therefore, it is less likely that the seat ring base 67 will warp after removal of the Y-shaped vanes 66 as compared to the single vane configuration of, for example, FIGS. 3–6.

Figure 12:
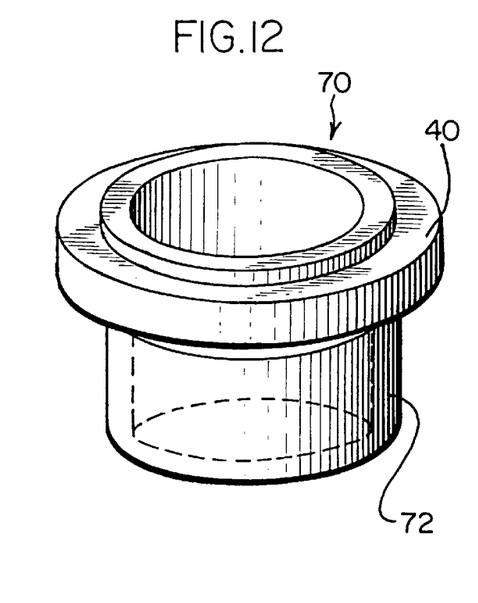
FIG. 12 is a perspective view of a third embodiment of a seat ring according to the present invention.

Referring now to FIG. 12, another embodiment of a seat ring 70 for use in the throttling valve 30 is illustrated. The seat ring 70 includes a cylindrical body 72 connected to the ring member 40. The walls of the cylindrical body 72 can extend any desired length away from the ring member 40. However, the length of these walls must be carefully designed to provide sufficient clearance between the cylindrical body 72 and the nearest surface of the fluid inlet passageway 16 so as to allow a desired maximum flow rate through the throttling valve 30. That is, the cylindrical body 72 must extend down below the seat ring 70 a sufficient amount to prevent vortices from occurring within the fluid inlet passageway 16, but should not extend so close to a surface of the fluid inlet passageway 16 that the seat ring 70 diminishes the fluid flow capacity of the throttling valve 30.

Figure 13:
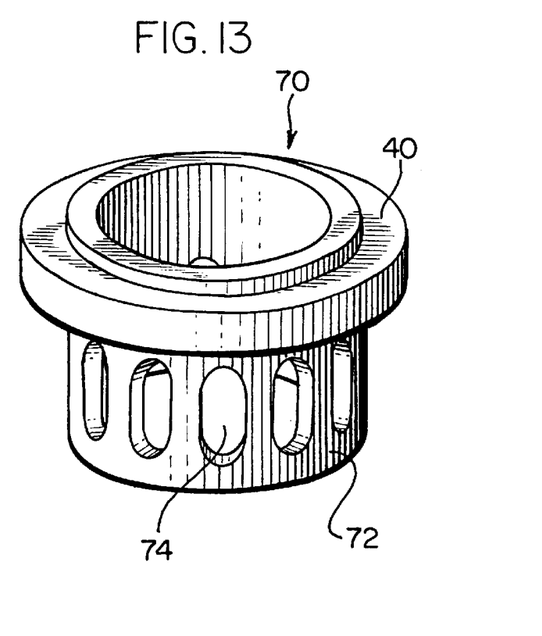
FIG. 13 is a perspective view of a fourth embodiment of a seat ring according to the present invention.

Referring to FIG. 13, an adaptation of the cylindrical body of FIG. 12 is illustrated as having oblong shaped holes 74 in the walls thereof. The holes 74, which can be of any desired shape and spaced at any desired spaced-apart locations in the walls of the cylindrical body 72, help to assure proper fluid flow capacity through the cylindrical body 72 while still allowing the cylindrical body 72 to break up or prevent vortices from occurring in the fluid inlet passageway 16. The embodiments of FIGS. 12 and 13, which include cylindrical bodies disposed concentrically with a ring member, have the advantage that they do not need to be oriented with respect to a particular direction when inserted into the throttling valve 30.

Although the cylindrical body 72 is illustrated in FIGS. 12 and 13 as being a tubular body having a circular cross-section and as being axially aligned with the ring member 40, the cylindrical body 72 could have any other shape, for example, any angular shape such as square, hexagonal, etc., and also could be configured other than coaxially with the ring member 40. The cylindrical body could also comprise multiple vanes extending straight down below the ring member 40 at one or multiple locations around the circumference of the ring member 40.

Figure 14:
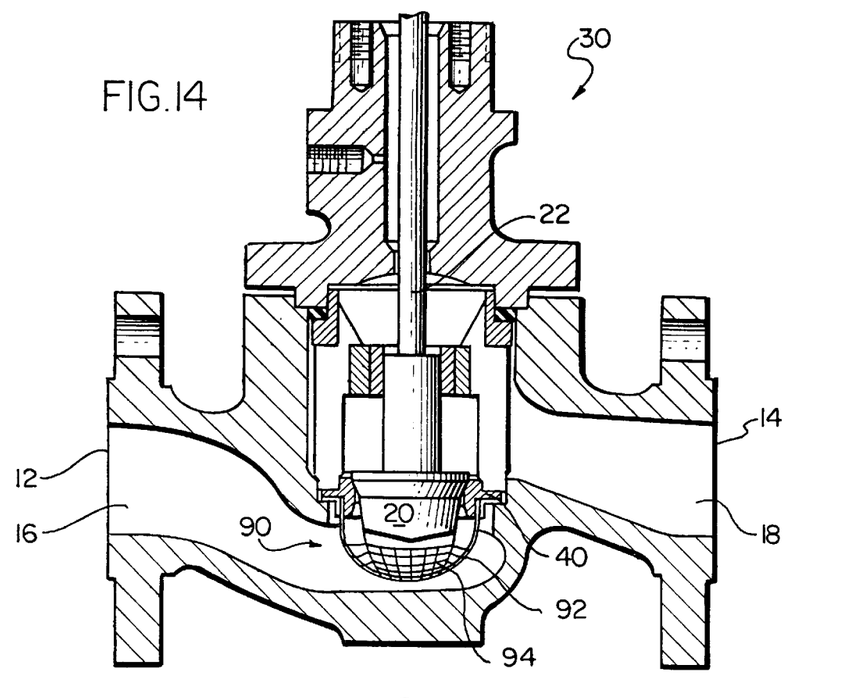
FIG. 14 is a cross-sectional view of a throttling valve having a fifth embodiment of a seat ring according to the present invention disposed therein.

A further embodiment of a seat ring 90 disposed in the throttling valve 30 is illustrated in FIG. 14. The seat ring 90 includes a basket 92 connected to the ring member 40 and disposed in the fluid inlet passageway 16. The basket 92 includes multiple wires coupled to the ring member 40 and a coarse mesh screen 94 connected to the wires. The wire and/or the coarse mesh screen 94 may be made of any desired material such as metal or plastic.

Importantly, the screen 94 should be made such that it does not operate to filter particles or other matter from the fluid flowing therethrough. That is, the mesh screen 94 should comprise a coarse screen having holes therein that are large enough to allow particles and other matter in the liquid or gas flowing through the valve 30 to pass therethrough. These holes comprise coarse passages. If the basket 94 operated as a filter, especially in a liquid application, particles would accumulate on the screen, block the flow path of the liquid and, eventually, cause the basket to fail due to the excessive force of the flowing liquid against the particles on the screen 94. As is evident, care must be taken to make the seat ring 90 structurally sound, especially when the seat ring 90 is used in a valve where high fluid flow forces are present.

While the above-described throttling valve and seat ring embodiments have been illustrated and described as including structural components, such as vanes, baskets or cylindrical bodies, which are connected to a seat ring for the purpose of stabilizing fluid flow, these structural components could, instead or in addition, be connected to any other member of the throttling valve, such as the valve plug and/or a wall of the fluid inlet passageway, as long as these members are disposed in the fluid inlet passageway proximate to the orifice between the fluid inlet and the fluid outlet passageways.

Figure 15:
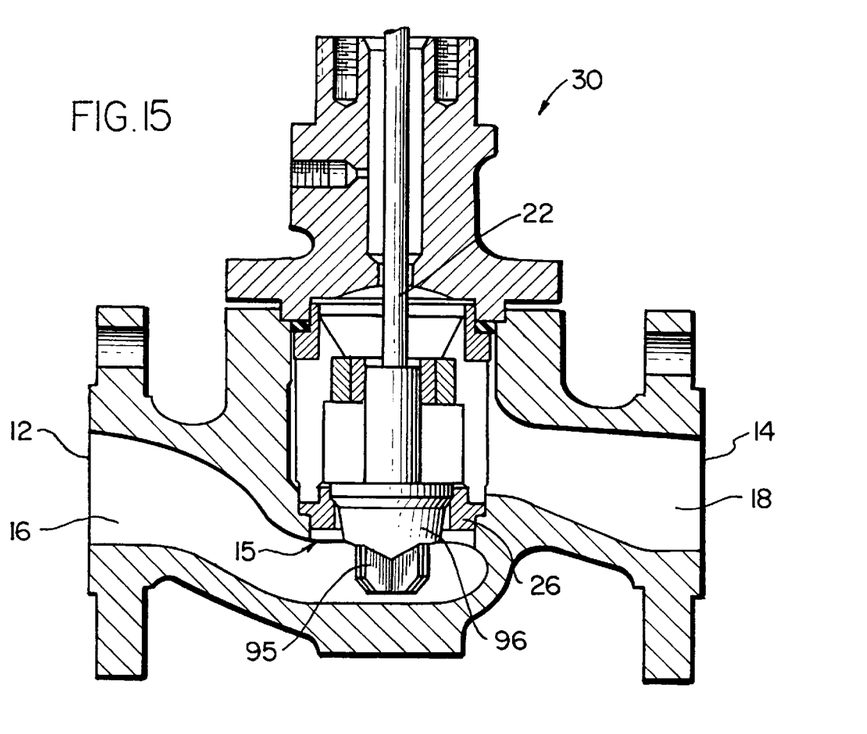
FIG. 15 is a cross-sectional view of a second embodiment of a throttling valve according to the present invention.
Figure 16:
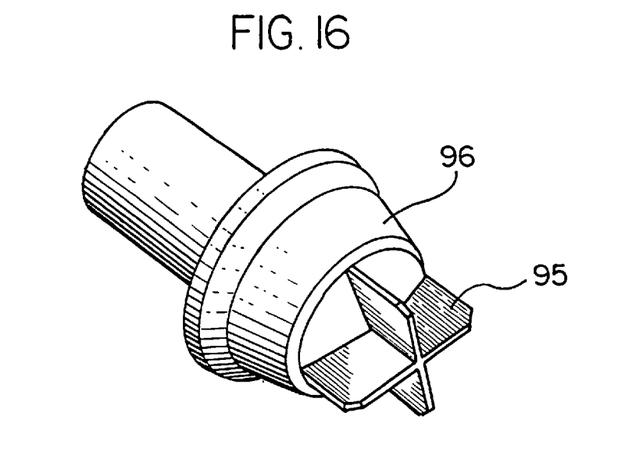
FIG. 16 is a perspective view of the valve plug illustrated in FIG. 15.

Referring now to FIG. 15, a throttling valve 30 having a cross-shaped vane member 95 attached to or formed with a valve plug 96 is illustrated. FIG. 16 illustrates the valve plug 96 and vane 95 in more detail. The vane 95, which can be of any desired size, shape or configuration including any of the vane (such as the Y-shaped vane), cylindrical body, basket, etc. configurations described or illustrated above with respect to the seat ring, extends from the bottom of the valve plug 96 so that it is disposed in the inlet fluid passageway 16. As a result, the vane 95 is disposed adjacent the orifice 15 and operates to reduce or eliminate flow disturbances near the orifice 15 which, in turn, stabilizes the flow rate of fluid through the valve 30. In some configurations, mounting a structural component such as the vane 95 on the valve plug 96 may induce flow generated torque on the valve stem 22 which would require adding anti-rotation devices to the valve stem 22.

Figure 17:
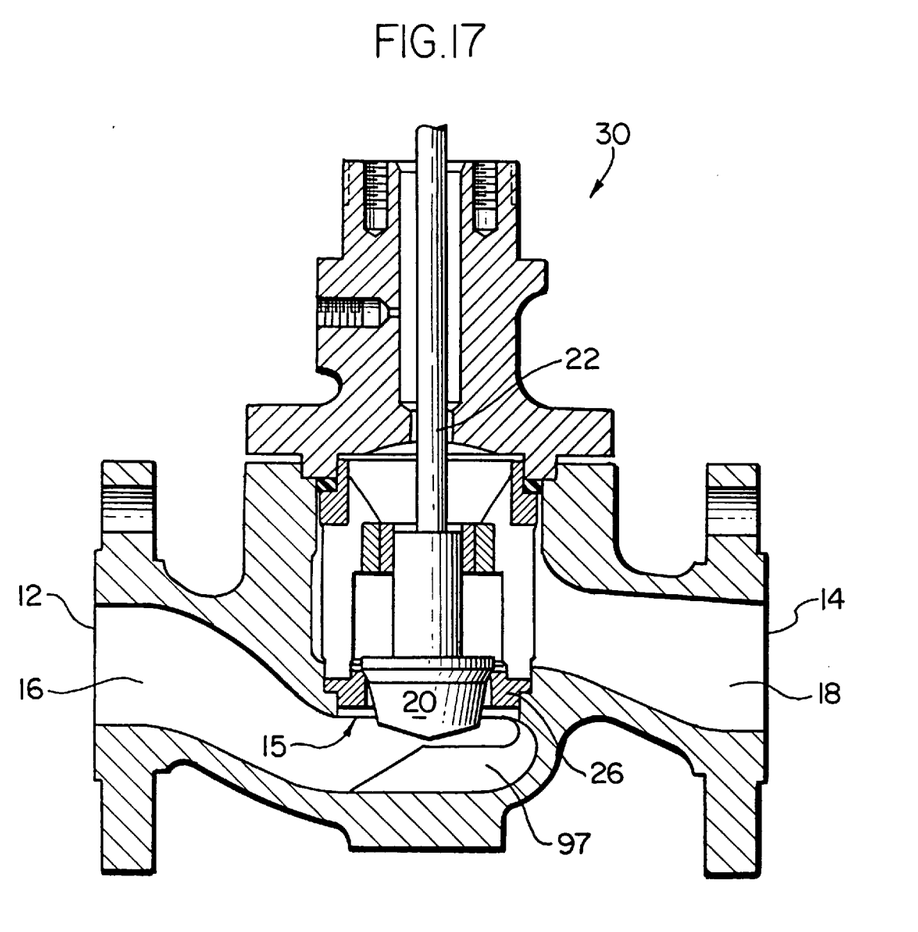
FIG. 17 is a cross-sectional view of a third embodiment of a throttling valve according to the present invention.
Figure 18:
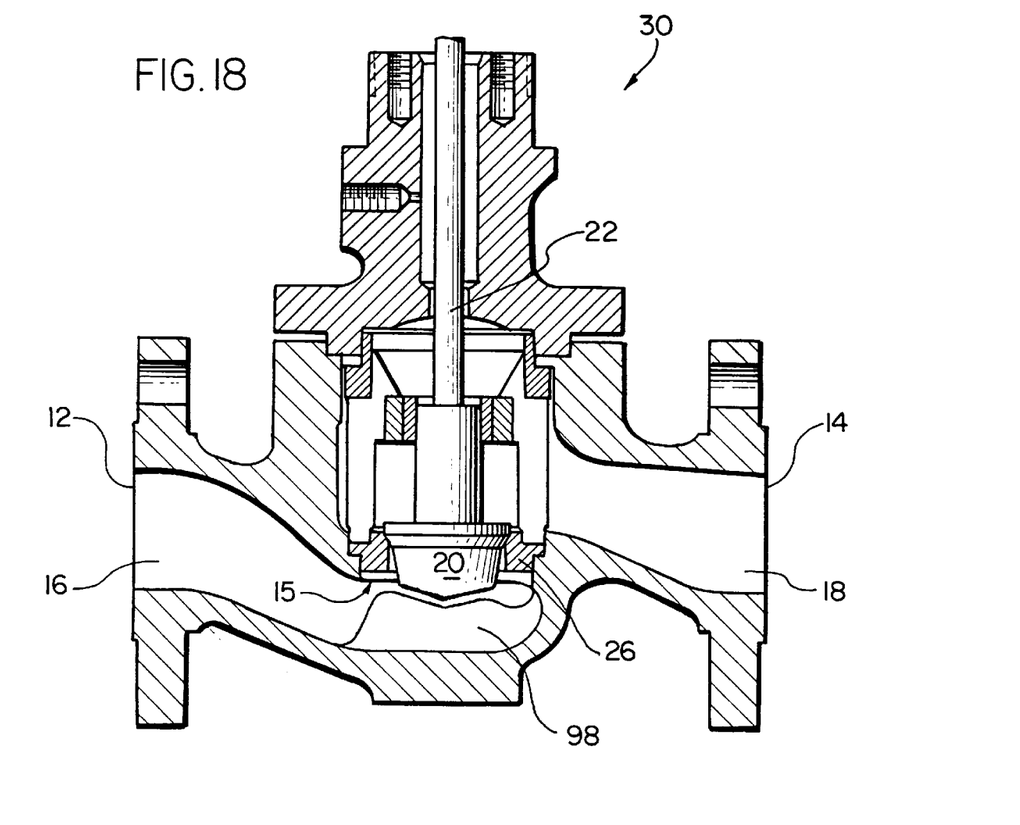
FIG. 18 is a cross-sectional view of a fourth embodiment of a throttling valve according to the present invention.

Referring to FIG. 17, a throttling valve 30 having a vane 97 attached to or formed with walls of the fluid inlet passageway 16 is illustrated. The vane 97, which may be cast along with the valve body of the valve 30 or added after casting of the valve body, is disposed in parallel to the flow of the fluid in the fluid inlet passageway 16 and extends approximately half way across the orifice 15 between the fluid inlet passageway 16 and the outlet fluid passageway 18, after which it tapers off to the bottom of the fluid inlet passageway 16. FIG. 18 illustrates a further vane 98 attached to the walls of the fluid inlet passageway 16 that extends across almost the entire orifice 15 and is contoured to accept the lower surface of the valve plug 20 when the valve plug 20 is in the closed position. The embodiments of FIGS. 17 and 18 have been given for example only, it being understood that any other desired member constructed according to the teachings hereof, including any vanes, cylindrical members, baskets, etc. described or illustrated herein with respect to the seat ring and valve plug embodiments, could be attached to the walls of a fluid inlet passageway or other parts of a valve, instead.

Regardless of whether a disturbance reduction member, comprising a vane, cylindrical body or other body, is connected to the seat ring, the valve plug, a wall of the fluid inlet passageway or other part of a valve, this disturbance reduction member must be disposed adjacent the orifice between the fluid inlet passageway 16 and the fluid outlet passageway 18. Otherwise, the disturbance reduction member will not prevent vortices from occurring between it and the orifice and, therefore, will not operate to prevent fluctuations in the valve flow rate.

For the purpose of this invention, it is considered that any flow disturbance reduction member that is attached to the seat ring or the valve plug of a valve and that extends into the fluid inlet passageway is disposed adjacent the orifice between the fluid inlet and the fluid outlet passageways.

Furthermore, when the fluid disturbance reduction member is attached or coupled to one or more walls of the fluid inlet passageway, this member is considered adjacent the orifice between the fluid inlet and the fluid outlet passageways if it extends around or across a significant portion of that orifice and/or extends into the fluid inlet passageway a significant amount. The further the disturbance reduction member extends into the fluid inlet passageway or around or across the orifice between the fluid inlet and the fluid outlet passageways, the more it tends to reduce vortices or other disturbances in the fluid inlet passageway. For the purposes of this invention, a fluid disturbance reduction member extends significantly into the fluid inlet passageway or around or across a significant portion of the orifice between the fluid inlet and the fluid outlet passageways when this member extends a minimum amount into an imaginary cylinder extending from the orifice between the fluid inlet and the fluid outlet passageways to the bottom of the fluid inlet passageway, such imaginary cylinder being coaxial with the orifice and having a diameter related to the nominal pipe size of the valve. Preferably, the fluid disturbance reduction member extends into or across the imaginary cylinder a minimal amount of at least 50 percent of the distance between the surface of the imaginary cylinder at which the member enters the cylinder and the axial point of the imaginary cylinder closest to the orifice. However, the reduction member may extend into or across the imaginary cylinder a minimal amount of as little as 20 percent of this distance and still operate with some degree of success. Of course, any percentage therebetween may be acceptable as well. Furthermore, the diameter of the imaginary cylinder is preferably 1.5 times the nominal pipe size of the valve. However, other multipliers, for example, anywhere between 1.0 and 1.5, could be used as well.

Regardless of the shape or attachment configuration of the disturbance reduction member, this member should not be constructed or configured so that it operates to filter the gas or liquid flowing through the valve. In other words, this member should not accumulate or collect relatively small particles or debris which may be in the fluid flowing through the valve. As a result, a coarse mesh passage, that is, a continuous fluid passage that is large enough to pass relatively small particles or debris that may be within the fluid and which does not, therefore, filter the fluid, should exist between the fluid inlet 12 of the fluid inlet passageway 16 and the orifice 15 of the valve 30. Such a coarse passage exists, for example, between the ring member 40 and the vane 50 of FIG. 2, between the ring member 40 and the vanes 62 and 64 of FIG. 11, through the ends and holes 74 of the cylindrical bodies 72 of FIGS. 12 and 13, through the holes in the coarse mesh screen 94 of FIG. 14 and between the vanes 95, 97 and 98 and the orifice 15 in the seat ring 26 of FIGS. 15, 17 and 18, respectively. If the disturbance reduction member did operate as a filter, this member might restrict the flow of the fluid through valve and would need to be periodically cleaned or replaced. It should be noted, however, that nothing herein would prevent placing a fluid filtering mechanism upstream of the flow disturbance reduction means in any known or desired manner if small particles or debris are present in the fluid.

Figure 19:
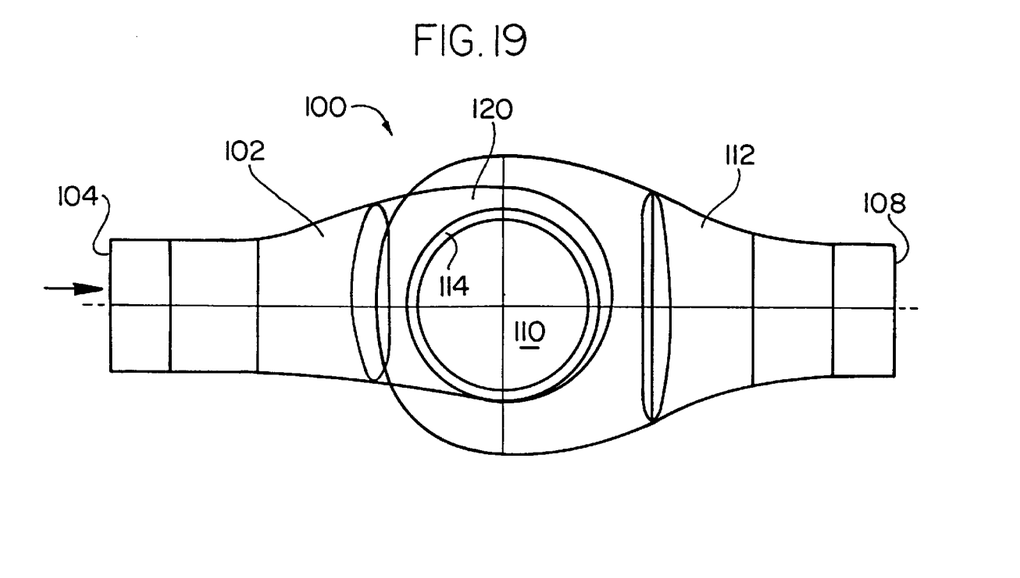
FIG. 19 is a bottom wire-frame diagram view of a fifth embodiment of a throttling valve according to the present invention.

According to another aspect of the present invention, it is desired to actually create a steady-state vortex within the fluid inlet passageway of a throttling valve so as to prevent intermittent vortices from occurring. FIG. 19 illustrates a bottom view of a wire-frame diagram of a throttling valve 100 constructed so as to create a steady-state vortex in a fluid inlet passageway 102. The fluid inlet passageway 102 of the throttling valve 100 couples a fluid inlet 104 to a fluid outlet 108 through an orifice 110 and a fluid outlet passageway 112. A valve plug (not shown) seats against any known seat ring 114 to open and close the valve 100, as is generally known.

The fluid inlet passageway 102 of the throttling valve 100 includes a cavity 120 that creates a vortex within the fluid in the fluid inlet passageway 102. The cavity 120 is formed on an end of the fluid inlet passageway 102 adjacent the orifice 110 and has a center that is not aligned with, that is, is offset from, the center of the seat ring 114. Furthermore, the walls of the cavity 120 are not symmetrically formed with respect to the fluid inlet 104. Because of this configuration, fluid entering the cavity 120 forms into a steady-state vortex. Furthermore, because the vortex created by the cavity 120 is stable, this vortex prevents intermittent vortices or disturbances from occurring and, thereby, provides the throttling valve 100 with a stable fluid flow rate.

Although the cavity 120 has been illustrated in the throttling valve 100 as being smooth and approximately circular in shape, i.e., having an approximately circular cross-section, any other desired cavity or shape could be used as long as this cavity shape creates a steady-state vortex within the fluid in the fluid inlet passageway 102.

The purpose of the members and asymmetrical cavity disposed in the fluid inlet passageway of a valve, as described herein, is to make the flow rate through the valve steady by either preventing vortices or creating steady-state vortices within the fluid inlet passageway. Thus, any member of any desired shape that is disposed within the fluid inlet passageway is considered to be within the coverage of this invention as long as this member operates to prevent swirling flow velocity components of the fluid in the fluid inlet passageway from transferring into the valve plug/seat ring area. Furthermore, any cavity of any desired shape that is formed or disposed in the fluid inlet passageway and/or any other means that creates a steady-state vortex in the fluid in a fluid inlet passageway of a valve is considered to be within the coverage of this invention.

Although the particular vortex preventing and creation devices illustrated herein have been illustrated as being used in flow-up globe and angle type valves, these devices may also be used in any other desired valves including flow-down valves in which the fluid flows downwardly through the valve plug orifice and/or valves that are automatically or manually controlled.

Although the fluid inlet passageway and the fluid outlet passageway have been illustrated herein as being significantly longer than the orifice therebetween, it is considered that the fluid inlet and the fluid outlet passageways could be any desired length and/or that the fluid inlet could be defined as being at any point upstream of the flow disturbance reduction member.

The foregoing detailed description has been given for clearness of understanding only and no unnecessary limitations should be understood therefrom, as modifications will be obvious to those skilled in the art.

We claim:

1. A valve comprising:
a fluid inlet passageway;
a fluid outlet passageway;
an orifice disposed between the fluid inlet passageway and the fluid outlet passageway, said orifice being used to control the amount of fluid flowing through the valve; and
a structural member disposed at the orifice having three vanes disposed in the fluid inlet passageway wherein one of the vanes has a radial component, and two of the vanes are disposed adjacent the orifice.

2. The valve of claim 1, wherein the three vanes are connected in a Y-shaped configuration.

3. The valve of claim 1, wherein the three vanes extend in radial directions from a center of the orifice to a circumference of the orifice and are offset from one another by an angle of approximately 120 degrees.

4. The valve of claim 1, wherein the structural member comprises a valve seat.

5. The valve of claim 1, wherein the structural member comprises a valve plug.

6. The valve of claim 1, wherein a first one of the vanes has a portion disposed the same distance from the orifice as a corresponding portion of a second one of the vanes.

7. A seat ring for use in a valve having a moveable valve plug disposed between a fluid inlet and a fluid outlet, the seat ring comprising:
a ring member having an aperture therein adapted to receive the valve plug; and
a vane member connected to the ring member including three vanes disposed over the aperture such that two of the vanes are disposed adjacent the aperture between the fluid inlet and the aperture.

8. The seat ring of claim 7, wherein the three vanes are connected in a Y-shaped configuration.

9. The seat ring of claim 7, wherein the three vanes extend radially from a center of the aperture to a circumference of the aperture and are offset from one another by an angle of approximately 120 degrees.

10. The seat ring of claim 7, wherein a first one of the vanes has a portion disposed the same distance from the aperture as a corresponding portion of a second one of the vanes.

11. A valve comprising:
a fluid inlet passageway;
a fluid outlet passageway;
an orifice disposed between the fluid inlet passageway and the fluid outlet passageway;
a structural member disposed at the orifice for effecting closure of the orifice; and
a vane member connected to the structural member having a wall, wherein one surface of the wall has a normal that is perpendicular to the direction of fluid flow through the orifice and wherein the wall extends between first and second locations that are at different distances away from a line passing through the center of the orifice in the direction of fluid flow through the orifice, for reducing swirling flow components of a fluid within the fluid inlet passageway.

12. The valve of claim 11, wherein the structural member comprises a valve seat.

13. The valve of claim 12, wherein the vane member comprises two vanes extending in radial directions from a center of the valve seat towards an exterior portion of the valve seat.

14. The valve of claim 13, wherein the two vanes are co-planer.

15. The valve of claim 12, wherein the vane member comprises three vanes extending in radial directions from a center of the valve seat towards an exterior portion of the valve seat.

16. The valve of claim 15, wherein the three vanes are offset from one another by approximately 120 degrees.

17. The valve of claim 12, wherein the vane comprises at least two vane members extending in radial directions from different circumferential portions of the valve seat towards the center of the valve seat.

18. The valve of claim 11, wherein the structural member comprises a valve plug.

19. A valve member adapted to be disposed in an orifice between a fluid inlet passageway and a fluid outlet passageway of a valve for effecting closure of the orifice, the valve member comprising:

a valve seat; and a vane member connected to the valve seat, including a wall, wherein one surface of the wall has a normal that is perpendicular to the direction of fluid flow through the orifice and wherein the wall extends between first and second locations that are at different distances away from a line passing through the center of the orifice in the direction of fluid flow through the orifice, for reducing swirling flow components of a fluid within the fluid inlet passageway.

20. The valve member of claim 19, wherein the vane member comprises at least two vane portions extending in radial directions from the center of the valve seat towards exterior portions of the valve seat.

21. The valve member of claim 19, wherein the vane member comprises three vanes extending in radial directions from the center of the valve seat towards exterior portions of the valve seat.

22. The valve of claim 22, wherein the three vanes are disposed in a Y-shaped configuration.

* * * * *